(12) United States Patent
Dvorkin

(10) Patent No.: US 9,436,012 B2
(45) Date of Patent: Sep. 6, 2016

(54) METHOD AND APPARATUS FOR LASER CUTTING

(71) Applicant: HIGHCON SYSTEMS LTD., Yavne (IL)

(72) Inventor: Lev Dvorkin, Ashdod (IL)

(73) Assignee: HIGHCON SYSTEMS LTD., Yavne (IL)

( * ) Notice: Subject to any disclaimer, the term of this patent is extended or adjusted under 35 U.S.C. 154(b) by 741 days.

(21) Appl. No.: 13/865,758

(22) Filed: Apr. 18, 2013

(65) Prior Publication Data

US 2013/0277341 A1 Oct. 24, 2013

Related U.S. Application Data

(63) Continuation of application No. PCT/IL2011/000774, filed on Sep. 27, 2011.

(60) Provisional application No. 61/405,664, filed on Oct. 22, 2010.

(51) Int. Cl.
```
G02B 27/14      (2006.01)
B23K 26/067     (2006.01)
B23K 26/38      (2014.01)
G02B 26/10      (2006.01)
```
(52) U.S. Cl.
CPC ............ *G02B 27/14* (2013.01); *B23K 26/067* (2013.01); *B23K 26/0676* (2013.01); *B23K 26/38* (2013.01); *G02B 26/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,710,798 A * | 1/1973 | Bredemeier | ........... | A61B 18/20 219/121.6 |
| 4,644,160 A * | 2/1987 | Arimoto | ................. | G02B 7/32 250/203.1 |
| 4,701,005 A * | 10/1987 | Noguchi | ................. | G02B 5/32 359/17 |
| 5,349,592 A * | 9/1994 | Ando | .................... | B82Y 10/00 369/112.22 |
| 5,611,946 A * | 3/1997 | Leong | ................. | B23K 26/032 219/121.6 |
| 5,685,995 A * | 11/1997 | Sun | ..................... | B23K 26/032 219/121.6 |
| 5,696,750 A * | 12/1997 | Katayama | ........... | G02B 5/1876 369/112.06 |
| 5,703,713 A * | 12/1997 | Leong | ................. | B23K 26/032 257/E21.526 |
| 5,728,993 A * | 3/1998 | O'Neill | ............. | B23K 26/0604 219/121.67 |
| 5,760,369 A * | 6/1998 | Wenkman | .............. | B44C 1/228 219/121.69 |

(Continued)

OTHER PUBLICATIONS

Tan et al. Dual Focus laser Micromachining, Journal of Modern Optics, vol. 52 No. 17 Nov. 20, 2005, See http://www.ryerson.ca/~tanbo/D_files/Dual-Focus%20Laser%20Micromachinning.pdf, pp. 2603-2606.*

(Continued)

*Primary Examiner* — Dana Ross
*Assistant Examiner* — Renee Larose
(74) *Attorney, Agent, or Firm* — Sughrue Mion, PLLC

(57) ABSTRACT

Method and system for laser cutting is disclosed. Using a novel dual-focus optical conversion unit. The dual-focus optical conversion unit may comprise a beam splitter and a convex mirror. The beam splitter may be insensitive to the polarization of an incident beam. The convex mirror may be placed beyond and parallel to the beam splitter, wherein the surface of the convex mirror may be coated with a reflective phase-retarder coating.

48 Claims, 2 Drawing Sheets

(56) References Cited

U.S. PATENT DOCUMENTS

| | | | | |
|---|---|---|---|---|
| 6,717,101 B2* | 4/2004 | Morris | B23K 26/0736 | 219/121.67 |
| 6,875,951 B2* | 4/2005 | Sakamoto | B23K 26/0608 | 219/121.73 |
| 6,984,802 B2* | 1/2006 | Kuroiwa | B23K 26/0608 | 219/121.73 |
| 6,990,136 B2* | 1/2006 | Akiyama | B23K 26/20 | 359/721 |
| 7,223,937 B2* | 5/2007 | Nagai | B23K 26/0057 | 219/121.67 |
| 7,356,240 B2* | 4/2008 | Adachi | B23K 26/0066 | 219/121.67 |
| 7,630,418 B2* | 12/2009 | Franjic | B23K 26/38 | 372/21 |
| 7,773,315 B2* | 8/2010 | Fuse | B23K 26/0732 | 359/558 |
| 7,858,901 B2* | 12/2010 | Krishnan | B23K 26/0617 | 219/121.68 |
| 2002/0144985 A1* | 10/2002 | Crevasse | B23K 26/38 | 219/121.68 |
| 2003/0058542 A1* | 3/2003 | Akiyama | B23K 26/20 | 359/618 |
| 2004/0226922 A1* | 11/2004 | Flanagan | B23K 26/0823 | 219/121.64 |
| 2006/0086704 A1* | 4/2006 | Nagai | B23K 26/0057 | 219/121.72 |
| 2006/0171656 A1* | 8/2006 | Adachi | B23K 26/0066 | 385/147 |
| 2006/0261050 A1* | 11/2006 | Krishnan | B23K 26/0617 | 219/121.74 |
| 2007/0017908 A1* | 1/2007 | Sercel | B23K 26/0732 | 219/121.73 |
| 2008/0105665 A1* | 5/2008 | Kondo | B23K 26/067 | 219/121.77 |
| 2008/0212185 A1* | 9/2008 | Fuse | B23K 26/0732 | 359/558 |

OTHER PUBLICATIONS

Meucci, Polarization selection by optical feedback, Optics Communications 268 (online), Jun. 29, 2006; http://www.complex.etsit.urjc.es/pdfs/LEYVA06_OC.pdf; p. 170.*

* cited by examiner

METHOD AND APPARATUS FOR LASER CUTTING

CROSS-REFERENCE TO RELATED APPLICATIONS

This application is being filed under 37 U.S.C. 111 as a continuation application (by-pass application) of International Application Number PCT/IL2011/000774, which has an international filing date of Sep. 27, 2011 and which claims priority to the following U.S. provisional application for patent: Ser. No. 61/405,664 filed on Oct. 22, 2010. This application claims the benefit of the priority date Oct. 22, 2010 under 37 U.S.C. 120 as a continuation of PCT/IL2011/000774, which claims priority as previously stated. The International Application Number PCT/IL2011/000774 is co-pending at the filing of this application and includes at least one common inventor. This application incorporates the above-identified International Application and United States Provisional application by reference in their entirety.

TECHNICAL FIELD

The present disclosure relates to the field of laser cutting process and more particularly to laser cutting process with multiple focal points for cutting at high speed and with high quality.

BACKGROUND ART

Traditionally high volume cutting of thin gage metals, cardboard, paper, etc. is done with mechanical press die-cutting tools operating at a very high number of hits per minute. This high volume cutting requires expensive dedicated cutting-tools, long setup, and professional knowledge. Laser cutting can replace the traditional mechanical cutting methods and achieve improved quality of the cut-edge as well as eliminating expensive cutting tools. However, the use of laser cutting may affect the productivity as the cutting speed slows down significantly when the thickness of the material (workpiece) to be cut increases.

Common laser cutting processes use lasers such as $CO_2$, YAG or fiber lasers for cutting workpieces of cardboard, paper, plastics, etc. Some of the existing cutting methods use multi-focal optics to create two or more focal-points in different locations along a single optical axis. The plurality of focal points creates a cylindrical energy distribution along the thickness of the workpiece (material) and increases the cutting speed as well as the quality of the cutting edges.

Few existing techniques split a laser beam into a plurality of beams by using of an optical conversion unit. The optical conversion unit can include a first plane reflecting mirror, which comprises two semicircular mirrors, which can be inclined independently of each other, and another reflecting mirror, having a single paraboloidal surface. Other existing method use dual-focus or bifocal lens. Yet other common method uses a multiple focal mirror device, which consists from a plurality of mirror surfaces arranged in serial to the incident light beam. Such construction may enable the creation of a plurality of focal points.

SUMMARY OF DISCLOSURE

However existing multi-focal cutting methods suffer from at least one of the following deficiencies. Some of them cannot provide an optimum power ratio between the first and the second focal points, this may affect the cutting speed. Most of the existing systems have complex and expensive structure in order to handle the high power laser that is used. Exemplary expensive structures may include different coatings of the system's elements. Exemplary coatings may be: coating sensitive to polarization, coating that change phase of the laser beam, and so on. The coatings of the existing system's elements are expensive when working with high-powered laser, and so on. High power lasers such as, but not limited to above a hundred watts. Part of the existing methods cannot be used for laser scanning because they cannot use telecentric or F-Theta focusing lens. Yet other prior art cannot be used when high power laser is used, above 100 Watt for example, and cannot be used at wavelength of $CO_2$ laser—10.6 um for example.

The above-described deficiencies in laser cutting do not limit the scope of the inventive concepts of the present disclosure in any manner. The deficiencies are presented for illustration only.

Exemplary embodiments of the present disclosure provide novel system and methods that may be implemented in laser cutting of workpieces made of thin metals, ceramic, cardboard, paper, plastic, etc. The novel methods and systems may enable high-speed cutting with high quality edges of material (workpiece) having thickness in the range of 0.1 mm to 5.0 mm, for example. The novel apparatus may use simple optical construction and inexpensive optical components, which can be used even with high power lasers.

Exemplary embodiments may employ: an inexpensive dual-focus optical conversion unit that may be used with high powered laser above hundreds of watts; one or more focusing devices; a laser scanning apparatus; and an objective lens such as but not limited to telecentric or F-Theta lens.

An exemplary embodiment may use a dual-focus optical conversion unit that may comprise a beam splitter that has a predetermined power ratio between reflected and transferred components of a laser beam that incident it (original beam). The beam splitter may be insensitive to the direction of the polarization of the incident laser beam and its reflected and transferred components. Among other advantages the beam splitter may be an inexpensive beam splitter even if used with high powered laser. Furthermore since the beam splitter is insensitive to the polarization, then there may be no requirements to the incident beam's polarization. The reflected by the back surface of the beam splitter part of the beam has the same polarization as the incident beam. Even further since the beam splitter is insensitive to the polarization, then the angle of the beam splitter in relation to the incident beam may be less critical for example it can be in a 45 degree angle. Exemplary range of angles may be: 20-60 degree.

The predetermined power ratio between reflected and transferred components of a laser beam that incident the beam splitter may be such that a large percentage of the original beam is reflected from the beam splitter, thus only a small portion of the laser power is transferred through the beam splitter. Exemplary power ratio between the reflected and transferred components of a laser beam may be: 50%-80% reflected and 20%-50% transferred.

The relatively inexpensive dual-focus optical conversion unit may further comprise a convex mirror. The convex mirror may be placed behind the beam splitter. Thus the beam that will incident the convex mirror may be the transferred beam from the beam splitter, thus has a low power. Exemplary power of the incident beam at the convex mirror may 20%-50% of the original beam laser beam that incident the beam splitter. Thus the laser beam that will incident the convex mirror will have a relatively small portion of the laser power. And thus the convex mirror may be coated by a relatively inexpensive reflective coating.

The relatively inexpensive reflecting coating may be a reflective phase-retarded coating, meaning the coating may change the polarization of the beam. For example if the beam has a linear polarization then the phase-retarded coating may change the beam's polarization to the circular, and vice versa.

Thus the above dual-focus optical conversion unit may create two beams in one direction, having different polarization and different divergence: One of the beams may be the reflected beam from the back surface of the beam splitter (R-beam). The R-beam may have a similar polarization and substantially similar divergence as the beam that incident the beam splitter (the original beam), and may have a high percentage of the power of the original laser beam. The other beam (D-beam) may be the beam that has been transferred by the beam splitter, reflected from the convex mirror, and transferred again through the beam splitter. The D-beam may have a different polarization than the R-beam and may have a different divergence. Furthermore the D-beam may have a lower power than the R-beam.

These two beams, R-beam and D-beam, may be directed and focused to the material (workpiece) needed to be cut by a 3-axis scanner with dynamical-focus unit, or by t-axis scanner with a telecentric or an F-Theta lens, for example, at two foci separated from one another. Wherein the first and the second foci may be located along an optical axis near the nominal focal point of the lens. Proper designing, assembling, and adjustment may enable focusing the R-beam at the first focal point and the D-beam at the second focal point along the same optical axis. The angle between directions of R-beam and D-beam may be close to zero. Wherein the first focal point may be close to the upper surface of the material needed to be cut, and the second focal point may be the close to the bottom surface of the material needed to be cut. Furthermore an optimum power ratio between said two foci may be obtained for the cutting of cardboard, paper, plastic sheets, etc with thickness from 0.1 mm up to 5 mm, for example.

Exemplary designing, assembling, and adjusting may comprise: choosing the appropriate beam splitter, convex mirror, coating, distance between them, etc. A distance 'D' between the beam splitter and the convex mirror may be quite small in relation to the radius of the convex mirror. In some embodiments the distance 'D' may be in the range of 5 to 5000 microns, for example. The radius of curvature of the convex mirror may be in the range of 15 to 100 meters, for example. The radius of curvature of the convex mirror may determine the distance between the two focal points in which R-beam and D-beam will focus at. Therefore the radius of curvature of the convex mirror may be configured to match a required distance between the two focal points. The required distance may be a function of the thickness range of the material (workpiece) to be cut, the distance from a scanner device and from incident laser beam diameter, for example. Scanner device such as but not limited to a galvo scanner. The distance from an optical conversion unit to a scanner device may be much shorter than radius of curvature of the convex mirror.

The designed ratio between the reflected and transferred components of the original beam at the beam splitter may determine the power ratio between the R-beam and D-beam at the two focal points. Further, the phase retarder reflective coating over the curved surface of the convex mirror that causes the difference in polarization between the R-beam and D-beam may enable to prevent destructive interference between—R-beam and D-beam.

Furthermore an alignment process and apparatus for the dual-focus optical conversion unit may be implemented. An exemplary embodiment of an alignment process and apparatus may comprise a detector such as but not limited to a thermal plate. The detector may be placed in different locations. Exemplary locations may be at different angles and distances from the beam splitter. For example the detector may be placed in two different locations along the optical axis of the focusing system, the first location may be near the beam splitter and the second location may be at distance from the first, equal to the focal distance of the focusing optics.

The detector may detect different parameters. Parameters such as, but not limited to: if the R-beam and the D-beam interfere each other, if the R-beam and the D-beam are collinear, if the R-beam and the D-beam have common interference pattern in two or more different points along the optical axis, etc. The inputs from the detector may be used for aligning the dual-focus optical conversion unit in order to meet different requirements. Exemplary requirements may be: minimal interference between R-beam and D-beam, minimum number of bands in each interference pattern at all locations of patterns, etc. For example interference patterns with two fringes interference. The alignment process and system may increase the cutting speed, for example Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

BRIEF DESCRIPTION OF DRAWINGS

Exemplary embodiments of the present disclosure will be understood and appreciated more fully from the following detailed description, taken in conjunction with the drawings in which.

DETAILED DESCRIPTION OF EMBODIMENTS

Turning now to the figures in which like numerals represent like elements throughout the several views, exemplary embodiments of the present disclosure are described. For convenience, only some elements of the same group may be labeled with numerals. The purpose of the drawings is to describe exemplary embodiments and is not for production purpose. Therefore features shown in the figures were chosen only for convenience and clarity of understanding thus the drawings are drawn out-of-scale.

In the following description, for purposes of explanation, numerous specific details are set forth in order to provide a thorough understanding. It will be apparent, however, to one skilled in the art that the invention may be practiced without these specific details. In other instances, structure and devices are shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
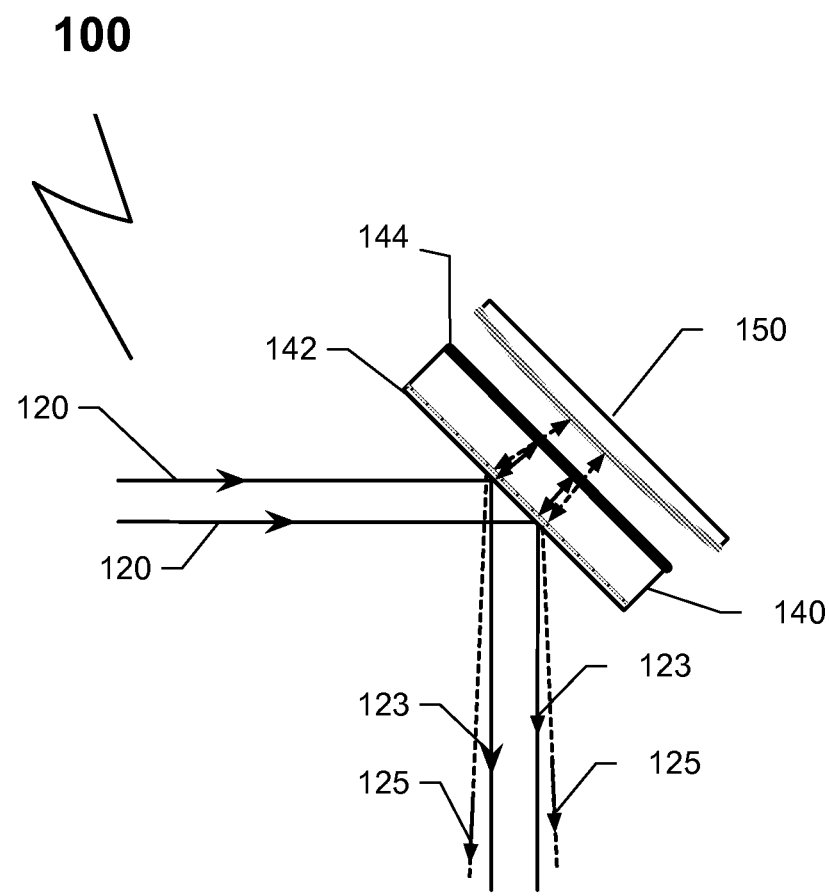
FIG. 1 illustrates a simplified schematic representation of an exemplary portion of an optical layout using an exemplary dual-focus optical conversion unit, according to the teaching of the present disclosure.

FIG. 1 illustrates a simplified schematic representation of an exemplary portion of an optical layout using an exemplary dual-focus optical conversion unit 100. The exemplary dual-focus optical conversion unit 100 may comprise, among other elements, a beam splitter (BS) 140 and a convex mirror (CM) 150. The BS 140 and the CM 150 may be parallel to each other and may be placed in 45 degrees to an incident laser beam 120 (original beam). In other embodiments the angle may be different. The range of wavelength of the original beam laser beam 120 may be between 0.35 micron to 12.0 micron, for example. Exemplary wavelength may be 10.6 micron, for example.

The incident beam 120 (original beam) may have circular polarization, for example. In other exemplary embodiments the original beam polarization may be linear or any other kind of polarization, since the beam splitter is insensitive to the polarization. The distance between the BS 140 and the CM 150 may be small in the range of few microns (5 to 5000, for example). The optical axis of BS 140 and CM 150 may be substantially united and have a 45 degree with the optical axis of the original beam 120. In alternate embodiments different angles may be used, there are no special requirements on the angle.

The front surface 142 of BS 140, the surface facing the incident beam (the original beam), may be coated by an anti-reflective coating. The backside surface marked 144 of the BS 140 may be coated by a partially reflective coating. The partially reflective coating may be insensitive to the direction of polarization of the incident laser beam 140. The partially reflective coating may be designed to reflect a predefined portion of the original beam 120.

The predefine-reflected power portion value may be planned and configured to the required needs. Exemplary predefine-reflected power portion value may be in the range of 50% to 80% of the power of the original beam 120, for example. The remaining portion of the original beam 120 power may be transferred toward the CM 150, for example.

For a laser beam 120 having wavelength of 10.6 micron an exemplary BS 140 may be made from ZnSe. Other exemplary BS 140 may be made from glass or fused silica materials for laser beams having wavelength in the range of 0.35 um to 3 um, and so on. Exemplary BS 140 may be ZnSe Beam Splitter manufactured by II-VI Infrared USA. Exemplary CM 150 may be coated by phase shift reflective coating that operates as phase retarder. An exemplary CM 150 can be coated by 90° phase shift reflective coating.

The convex radius of the CM 150 may be very large compared to the distance between the CM 150 and a scanner that controls the position of the laser beams over the material (workpiece) to be cut. The scanner may be a two dimensional galvo scanner, for example. Exemplary curvature radius of CM 150 may be in the range of 15 to 100 meters, for example. The radius of curvature of the convex mirror may be configured to match the thickness range of the material to be cut. The radius of CM 150 may be designed such that the distance between the two foci is in the range of the thickness of the material to be cut. Exemplary CM 150 may be manufactured by II-VI Infrared USA, for example.

When a laser beam 120 (original laser beam) having a circular polarization enters the conversion unit 100, then this beam 120 may enter the BS 140 with hardly any reflections from the front surface 142 of the BS 140, since it is coated with anti-reflecting coating. Next the laser beam 120 may be partially reflected from the backside surface 144 of the BS 140 which may be coated by a partially reflecting coating that may be insensitive to polarization, as illustrated by R-beam 123. The direction of the reflected R-beam 123 may be in 90 degrees to the incident beam 120 and may have the same polarization as the original laser beam 120, meaning a circular polarization. The power of the R-beam 123 may be in the range of 50-80% of the power of the incident beam 120 (the original laser beam). The beam divergence of the reflected beam 123 may be substantially similar to the beam divergence of the incident beam 120.

The rest of the original laser beam 120, around 20%-50% of the original laser beam 120, may be transferred through the partially reflecting coating of the backside surface 144 of the BS 140 toward the CM 150 and then may be reflected back by the CM 150, which may be coated by a phase shift reflective coating that acts as a phase retarder, as the D-beam 125. D-beam 125 may then be transferred through the BS 140. At the output of the BS 140 R-beam 123 and D-beam 125 may propagate along the same optical axis. Because CM 150 may be coated by phase shift reflective coating that operates as a phase retarder, the D-beam 125 may have a polarization other than the incident beam 120. For example, if the polarization of the incident beam 120 is circular, then D-beam 125 reflected from the CM 150 may have a linear polarization, and vice versa.

Due to the convex radius of the CM 150 the divergence value of the D-beam 125 may be slightly larger than the divergence value of the R-beam 123. The difference between the divergence values together with an F-Theta or telecentric lens or objective 260 (FIG. 2) may create two different foci for D-beam 125 and R-beam 123. The distance between the two different foci may match the required thickness of the material (workpiece) that needs to be cut. The difference between two foci can be controlled by the convex radius of CM 150, by incident laser beam diameter, by wavelength of the laser beam and by the focal distance of the focusing optics.

R-beam 123 with the smaller divergence may have a focal point close to the upper surface of the material to be cut while D-beam 125 with the bigger divergence may have a focal point close to the lower surface of the material to be cut. Consequently, the optical conversion unit 100 may deliver two beams, having a designed power ratio, with designed divergences and different polarizations.

In addition the polarization of D-beam 125 is other than the polarization of the R-beam 123 due to the phase retarder coating of the CM 150. In an exemplary embodiment the polarization of R-beam 123 may be circular while the polarization of D-beam 125 may be linear. A two axes galvo-scanner may be used in order to control the movement of the two beams R-beam 123 and D-beam 125 according to a required pattern. The galvo-scanner may be controlled by a computer. In addition an F-Theta or telecentric lens may be used in order to focus the two beams R-beam 123 and D-beam 125. More information is disclosed in conjunction with FIG. 2.

Figure 2:
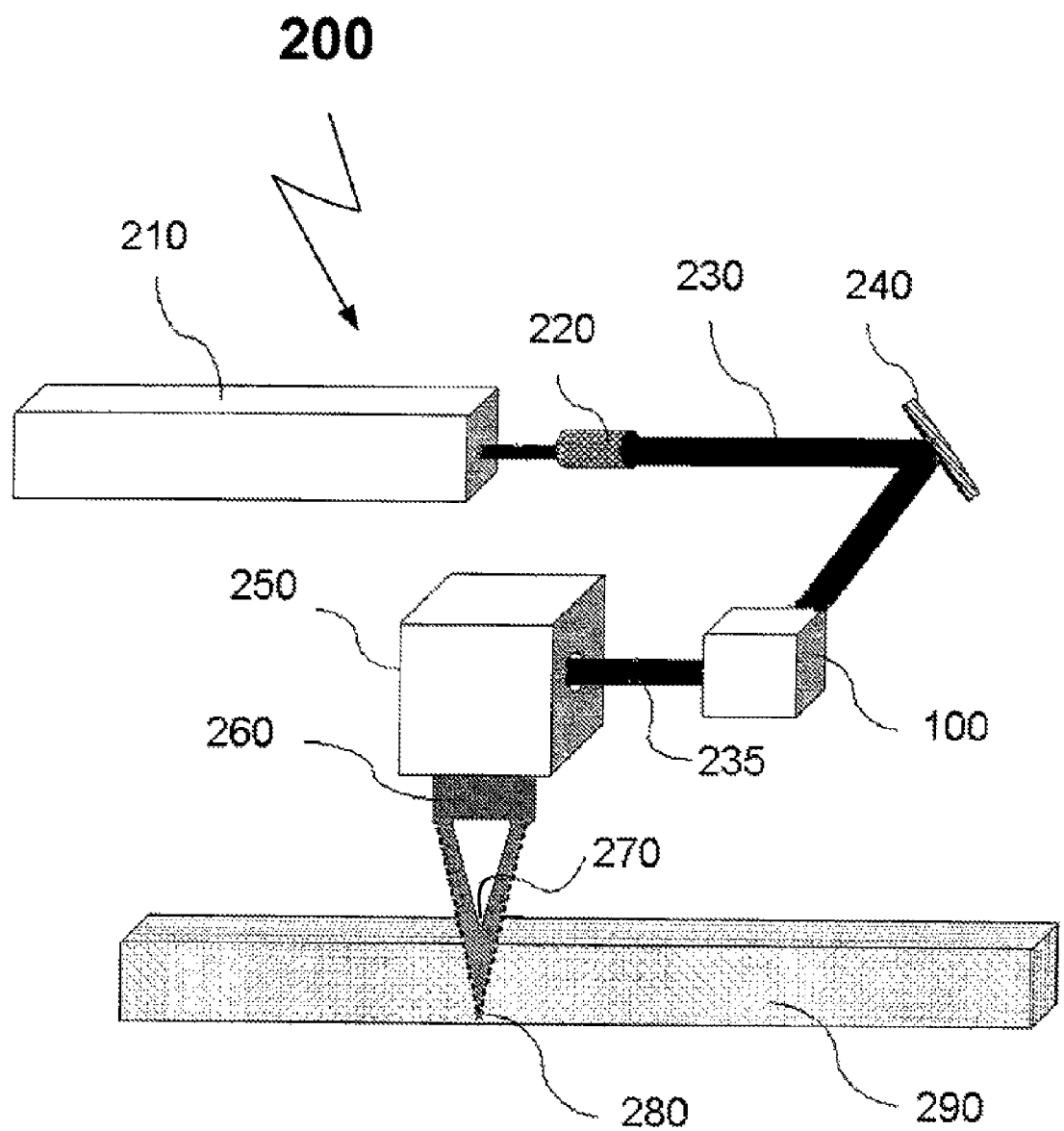
FIG. 2 depicts schematic illustrations of simplified block diagrams with relevant elements of an exemplary laser cutting machine, according to the teaching of the present disclosure.

Referring now to FIG. 2 that illustrates a simplified block diagrams with relevant elements of an exemplary optical system 200 which may be a part of a cutting machine. An exemplary cutting machine may have one or more similar optical systems 200. The systems 200 may be place in a perpendicular axis to the movement axis of the workpiece (material) to be cut. An exemplary optical system 200 can comprise, among other elements: a laser source 210 for generating a laser beam 230; at least one beam expander 220 through which the laser beam passes; a dual-focus optical conversion unit 100; a scanner 250, such as but not limited to a galvo-scanner; and an F-Theta or telecentric lens or objective 260.

In other exemplary embodiments the dual-focus optical conversion unit 100 may be placed in other location along the optical path between the laser source 210 and the scanner 250. In addition one or more folding mirror 240 may be used but are not mandatory. In other exemplary embodiments a folding mirror may not be necessary. Yet in other embodiments the dual-focus optical conversion unit 100 may be used instead of a folding mirror. Further, the cutting machine may comprise a conveyor (not shown in the drawing, which carries a workpiece (material) 290 to be cut. Workpiece 290 may be cardboard, paper, plastic sheets, etc.

The laser source 210 may be a $CO_2$ laser type, a YAG or a fiber type laser. The beam power may be in the range of few tens watts to several hundreds of watts. A laser source 210, which may deliver 100 to 500 watts, may be used for cutting cardboard sheets with width of 0.2 to 1.5 mm, for example. The power of the laser and the number of the required optical systems 200 may be a function of the required cutting speed, the size of the workpiece and its thickness. The polarization of beam 230 may be a circular polarization, for example.

During operation, the laser source 210 may generate the laser beam 230 that may pass through the beam expander in order to get a desirable diameter to meet the system requirements. Then the beam may pass via one or more folding mirrors 240 in order to comply with the required optical path. The folded beam 230 may reach the optical conversion unit 100 that is disclosed above in conjunction with FIG. 1. At the dual-focus optical conversion unit 100, the beam 230 may be divided into two beams, an R-beam and a D-beam, that may propagate along the same optical axis 235, as R-beams 123 and D-beam 125 in FIG. 1. The power ratio between the R-beam and the D-beam along the optical axis 235 may have a designed value that is adapted to cut the material faster.

In some embodiments the power of the R-beam along optical axis 235 may be 80% of the power of the incident beam 230 while the power of the D-beam along optical axis 235 may be 20% of the power of the incident beam 230. In other embodiments the power of the R-beam along optical axis 235 may be 50% of the power of the incident beam 230 while the power of the D-beam along optical axis 235 may be 50% of the power of the incident beam 230. In other embodiments the power ration may be any value in the range between the two above examples.

The R-beam along optical axis 235 may have the circular polarization as the original beam 230, and D-beam along optical axis 235 may have a linear polarization. In other exemplary embodiment, the incident beam 230 may have linear polarization. In such embodiment the R-beam along optical axis 235 may have the linear polarization as the original beam 230, and the D-beam along optical axis 235 may have a circular polarization. In other exemplary embodiments, the incident beam 230 may have any other polarization, for example the azimuthal or the radial polarizations. The divergence value of the second beam D-beam along optical axis 235 may be bigger than the divergence value of the R-beam along optical axis 235.

The two beams along the optical axis 235 (R-beam and D-beam) may enter the scanner 250. The scanner 250 may control the cutting path of the above two beams along a pre define pattern over the material to be cut. The scanner 250 may be a galvo-scanner that may include one mirror for reflecting the beams along one axis or may have two movable mirrors for reflecting the two beams along two axes. These two reflected beams, R-beam and D-beam along the same optical axis, from the galvo-scanner may pass through lens such as F-Theta or telecentric lens. In other exemplary embodiments, the galvo scanner 250 may have three axes. In such a scanner, in addition to the two mirrors, both R-beam and D-beam along the optical axis 235 may pass via a dynamic focusing lens and then via static focusing lens, mounted inside the scanner before the scanner mirrors.

Due to the difference in the divergence value of each beam, the R-beam with the smaller divergence value will be focused close to the upper surface of the workpiece (material) 290 at focal point 270, for example. The D-beam with the larger divergence value will be focused close to the lower surface of the workpiece to point 280. The radius of CM 150 (inside the dual-focus optical conversion unit 100) may be designed such that the distance between the foci of the 270 and 280 after lens 260 will be in the range of the thickness of the material needed to be cut.

In the description and claims of the present disclosure, each of the verbs, "comprise", "include" and "have", and conjugates thereof, are used to indicate that the object or objects of the verb are not necessarily a complete listing of members, components, elements, or parts of the subject or subjects of the verb and further, all of the listed objects are not necessarily required in all embodiments.

As used herein, the singular form "a", "an" and "the" include plural references unless the context clearly dictates otherwise. For example, the term "a material" or "at least one material" may include a plurality of materials, including mixtures thereof.

In this disclosure the words "unit", "element", and/or "module" are used interchangeably. Anything designated, as a unit, element, device, and/or module may be a stand-alone unit or a specialized module. A unit, element, and/or module may be modular or have modular aspects allowing it to be easily removed and replaced with another similar unit, element, and/or module. Each unit, element, and/or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present disclosure has been described using detailed descriptions of embodiments thereof that are provided by way of example and are not intended to limit the scope of the disclosure. The described embodiments comprise different features, not all of which are required in all embodiments of the disclosure. Some embodiments of the present disclosure utilize only some of the features or possible combinations of the features. Many other ramifications and variations are possible within the teaching of the embodiments comprising different combinations of features noted in the described embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention.

It will be appreciated by persons skilled in the art that the present disclosure is not limited by what has been particularly shown and described herein above. Rather the scope of the disclosure is defined by the claims that follow.

It is to be understood that the above description is intended to be illustrative, and not restrictive. For example, the above-described embodiments may be used in combination with each other. Many other embodiments will be apparent to those of skill in the art upon reviewing the above description.

What is claimed is:

1. A dual-focus optical conversion unit, comprising:
   a beam splitter (BS) that is placed at angle to an incident laser beam, and is adapted to split an incident beam into two beams having a similar polarization as the incident beam, a reflected beam and a transferred beam; and
   a convex mirror (CM) placed beyond and parallel to the BS, wherein the surface of the CM is coated with a reflective phase-retarder coating, and is placed substantially close to the BS;
   wherein the dual-focus optical conversion unit is configured to split the incident-laser beam into two beams, a R-beam reflected from the BS; and a D-beam that pass through the BS and is reflected and changed polarization by the coated surface of the CM and returns via the BS, wherein the R-beam and the D-beam have different polarizations and propagates along a substantial similar optical axis, wherein the R-beam and the D-beam differ in their divergence value, and wherein the power of the beam incident on the convex mirror (CM) is in the range of 20% to 50% of the power of the incident laser beam.

2. The dual-focus optical conversion unit of claim 1, wherein the polarization of the incident laser beam is a circular polarization.

3. The dual-focus optical conversion unit of claim 1, wherein the distance between the BS and the CM is in the range of 0.1 mm to 5 mm.

4. The dual-focus optical conversion unit of claim 1, wherein the curvature radius of the CM is in the range of 20 meters to 100 meters.

5. The dual-focus optical conversion unit of claim 1, wherein the power of the R-beam is in the range of 50% to 80% of the power of the incident laser beam.

6. The dual-focus optical conversion unit of claim 1, wherein the back side of the BS is coated by a partially reflective coating and the front side is coated by an anti-reflective coating.

7. The dual-focus optical conversion unit of claim 1, wherein the wavelength of the laser beam is in the range of 0.35 to 12 micron.

8. The dual-focus-optical conversion unit of claim 1, wherein the wavelength of the laser beam is 10.6 micron and the BS is made from ZnSe.

9. The dual-focus optical conversion unit of claim 1, wherein the wavelength of the laser beam is in the range of 0.35 to 3.0 micron then BS is made from glass or fused silica materials.

10. The dual-focus optical conversion unit of claim 1, wherein the dual-focus optical conversion unit is used in a laser cutting machine for cardboard.

11. The dual-focus optical conversion unit of claim 10, wherein the thickness of the cardboard sheet is between 0.1 mm to 1 mm.

12. The dual-focus optical conversion unit of claim 1, wherein the power of the incident laser beam is in the range of 100 to 500 watts.

13. The dual-focus optical conversion unit of claim 1, further comprising a scanner and an F-Theta lens for controlling the movement of the R-beam and the D-beam along a predefine pattern.

14. The dual-focus optical conversion unit of claim 13, wherein the scanner is a galvo-scanner.

15. The dual-focus optical conversion unit of claim 1, further comprising a galvo-scanner having a dynamic focusing lens and a static focusing lens.

16. The dual-focus optical conversion unit of claim 13, 14, or 15, wherein the curvature radius of the CM is significantly larger than the distance between the BS and the scanner.

17. The dual-focus optical conversion unit of claims 1, wherein the angle in which the beam splitter (BS) that is placed to an incident laser beam is substantially 45 degrees.

18. The dual-focus optical conversion unit of claims 1, wherein the substantial similar optical axis is substantial perpendicular to the optical axis of the incident laser beam at the entrance of the dual-focus-optical conversion device.

19. The dual-focus optical conversion unit of claims 1, wherein the reflective phase-retarder coating is a 90° phase shift reflecting coating.

20. A laser cutting machine, comprising:
a. a laser source that generates an incident laser beam;
b. a dual-focus optical conversion unit that splits the incident laser beam into two beams, a R-beam and a D-beam, wherein the R-beam and a D-beam have different polarizations and propagates along a substantial similar optical axis, wherein the R-beam and a D-beam differ in their divergence value, the dual-focus optical conversion unit including a beam splitter (BS) and a convex mirror (CM), wherein the R-beam is reflected from the BS; and the D-beam passes through the BS and is reflected and changes polarization by a coated surface of the CM, and the power of the beam incident on the coated surface of the CM is in the range of 20% to 50% of the power of the incident laser beam; and
c. a scanner that reflects the R-beam and a D-beam received from the dual-focus optical conversion device along a certain pattern through an objective lens toward a workpiece, wherein the objective lens focuses the R-beam and the D-beam at two different foci along the same optical axis.

21. The laser cutting machine of claim 20, wherein the R-beam is focused substantially close to an upper surface of the workpiece and the D-beam is focused substantially close to a lower surface of the workpiece.

22. The laser cutting machine of claim 20, wherein the beam splitter (BS) is placed at an angle to the incident laser beam, and is adapted to split the beam into two beams having a similar polarization as the incident beam; and
the convex mirror (CM) is disposed beyond and parallel to the BS, wherein the surface of the CM is coated by a 90° phase shift coating, which operates as a reflective phase retarder, and is placed substantially close to the BS; and
wherein the dual-focus optical conversion unit is configured to split the incident laser beam into two beams, the R-beam reflected from the BS, and the D-beam that pass through the BS and is reflected and change polarization by the coated surface of the CM and return via the BS, wherein R-beam and the D-beam have different polarizations and propagates along a substantial similar optical axis, and wherein the R-beam and the D-beam differ in their divergence value.

23. The laser cutting machine of claim 20, wherein the polarization of the incident laser beam is a circular polarization.

24. The laser cutting machine of claim 22, wherein the distance between the BS and the CM is in the range of 0.1 mm to 5 mm.

25. The laser cutting machine of claim 22, wherein the curvature radius of the CM is in the range of 20 meters to 100 meters.

26. The laser cutting machine of claim 20, wherein the power of the R-beam is in the range of 50% to 80% of the power of the incident laser beam.

27. The laser cutting machine of claim 22, wherein the back side of the BS is coated by a partially reflective coating and the front side is coated by an anti-reflective coating.

28. The laser cutting machine of claim 20, wherein the wavelength of the laser beam is in the range of 0.35 to 12 micron.

29. The laser cutting machine of claim 22, wherein the wavelength of the laser beam is 10.6 micron and the BS is made from ZnSe.

30. The laser cutting machine of claim 22, wherein the wavelength of the laser beam is in the range of 0.35 to 3.0 micron and the BS is made from glass or fused silica materials.

31. The laser cutting machine of claim 20, wherein is used for cutting cardboard.

32. The laser cutting machine of claim 31, wherein the thickness of the cardboard is between 0.1 mm to 1.5 mm.

33. The laser cutting machine of claim 20, wherein the power of the incident laser beam is in the range of 100 to 500 watts.

34. The laser cutting machine of claim 20, wherein the objective lens focuses is an F-Theta lens.

35. The laser cutting machine of claim 20, wherein the scanner is a galvo-scanner.

36. The laser cutting machine of claim 35, wherein the galvo-scanner has a dynamic focusing lens and a static focusing lens.

37. The laser cutting machine of claim 20 and 22, wherein the curvature radius of the CM is significantly larger than the distance between the BS and the scanner.

38. The laser cutting machine of claim 22, wherein the angle in which the beam splitter (BS) that is placed to an incident laser beam is substantially 45 degrees.

39. The laser cutting machine of claim 22, wherein the substantial similar optical axis is substantial perpendicular to the optical axis of the incident-laser beam at the entrance of the dual-focus optical conversion device.

40. A method for converting an incident laser beam into two beams, comprising:
a. splitting an incident laser beam into two beams, a first beam and a second beam;
b. reflecting the first beam along an optical axis while conserving the polarization and a similar divergence value of the incident beam;
c. changing the polarization of the second beam using a coated surface of a convex mirror; and
d. reflecting of the second beam with changed polarization while increasing the divergence value of this beam;
wherein the reflected-changed-polarization-second beam and the reflected first beam propagates along a substantial similar optical axis, and wherein the power of the beam incident on the convex mirror is in the range of 20% to 50% of the power of the incident laser beam.

41. The method of claim 40, further comprise:
e. scanning the reflected first beam and the reflected-changed-polarization-second beam along a certain pattern through an objective lens toward a workpiece, and
f. focusing the reflected first beam and the reflected-changed-polarization-second beam at two different foci along the substantial similar optical axis.

42. The method of claim 40, wherein the polarization of the incident laser beam is a circular polarization.

43. The method of claim 40, wherein the power of the first beam is in the range of 50% to 80% of the power of the incident laser beam.

44. The method of claim 40, wherein the wavelength of the laser beam is in the range of 0.35 to 12 micron.

45. The method of claim 40, is used for cutting cardboard.

46. The method of claim 40, wherein the power of the incident laser beam is in the range of 100 to 500 watts.

47. The method of claim 41, wherein the focusing is done by a F-Theta lens.

48. The method of claim 41, wherein the scanning is done by a galvo-scanner.

* * * * *